(12) United States Patent
Ondrus

(10) Patent No.: US 6,560,544 B1
(45) Date of Patent: May 6, 2003

(54) METHOD FOR MONITORING A MIXTURE

(75) Inventor: Daniel Joseph Ondrus, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/561,279

(22) Filed: Apr. 28, 2000

(51) Int. Cl.⁷ .......................... G01N 31/00; G06F 19/00
(52) U.S. Cl. .............................. 702/23; 702/25; 702/24
(58) Field of Search ........................... 702/23, 185, 25; 73/61.41, 579; 222/66; 210/701

(56) References Cited

U.S. PATENT DOCUMENTS

| | | | | |
|---|---|---|---|---|
| 4,944,185 A | * | 7/1990 | Clark, Jr. et al. ............. 73/579 |
| 5,006,845 A | * | 4/1991 | Calcar et al. ................ 340/853 |
| 5,156,298 A | * | 10/1992 | LaRue .......................... 222/66 |
| 5,171,450 A | * | 12/1992 | Hoots .......................... 210/701 |
| 5,451,505 A | * | 9/1995 | Dollinger ....................... 435/6 |
| 5,831,151 A | * | 11/1998 | Ondrus ....................... 73/61.41 |
| 5,882,149 A | * | 3/1999 | DeWitt et al. ................ 406/56 |
| 5,935,755 A | * | 8/1999 | Kazmaier et al. ........... 430/120 |
| 6,025,200 A | * | 2/2000 | Kaish et al. .................. 436/56 |
| 6,073,089 A | * | 6/2000 | Baker et al. ................ 702/185 |
| 6,216,091 B1 | * | 4/2001 | Hammond ................... 702/23 |

* cited by examiner

Primary Examiner—John Barlow
Assistant Examiner—Aditya Bhat
(74) Attorney, Agent, or Firm—David B. Kelley

(57) ABSTRACT

A method for monitoring a mixture is disclosed. The method includes acquiring amounts of components at predetermined intervals of time for a cycle during which the mixture is being dispensed such that fluctuations in the amounts of components in the mixture may be detected.

20 Claims, 1 Drawing Sheet

METHOD FOR MONITORING A MIXTURE

FIELD OF INVENTION

The present invention relates to a method for monitoring components in a mixture. More specifically, the present invention relates to a method for monitoring components in a mixture wherein at least one component includes a taggant which is monitored to determine the amount of that one component in the mixture.

BACKGROUND OF THE INVENTION

It is often desirable to maintain two or more components of a particular mixture separated until such time as the components need to be mixed and/or combined to form the particular mixture. For example, many mixtures, (e.g., adhesive mixtures) have components which, when mixed or combined, tend to dry or cure and form a solid. Therefore, the components within an adhesive mixture must remain separated until such time as the adhesive is to be applied to an article of manufacture. Otherwise, the components will solidify prior to being applied to an article of manufacture thereby rendering the adhesive mixture useless.

Consequently, mixing assemblies or systems have been developed which combine components of mixtures and/or adhesives according to certain ratios such that the components of the mixture may be separate until such time as the mixture is needed. An example of such an assembly or system is disclosed in U.S. Pat. No. 5,831,151, to Ondrus (the "'151' patent"), which is fully and completely incorporated herein by reference.

Mixing systems, such as the one disclosed in the '151 patent, are typically used in conjunction with conventional methods to produce mixtures having a particular ratio of components. The systems conventionally include a first component which includes or contains a taggant (i.e., a material which can be detected and monitored) and a second component. Both the first and second components are directed toward a mixing location where the mixture is formed and, thereafter, the mixture flows toward a dispensing location where a predetermined amount of mixture is dispensed for a predetermined period of time upon an article of manufacture. The predetermined amount of mixture and/or the predetermined amount of time for which adhesive is dispensed to an article of manufacture is referred to as a cycle.

Furthermore, in these conventional systems, the taggant in the first component is monitored at a first location where the first component is flowing or traveling alone toward the mixing location, and at a second location where the mixture is flowing toward the dispensing location after the first and second components have been mixed or combined. The amount or concentration of taggant monitored at each location is then converted into data and is conventionally manipulated to determine the proportion or amount at which the first and second components reside or exist in the mixture for a particular cycle (i.e., the predetermined amount and/or time of dispensing mixture on a particular article). The proportion or amount of one or both of the components for the cycle is then compared to a target proportion or amount at which the component or components are to be dispensed to insure that there is a proper amount of the first and second component in the mixture.

These conventional methods and/or systems for monitoring a mixture suffer from drawbacks. For example, the conventional method only measures the proportion of the first component and/or the second component in the mixture for a single average of the entire cycle or at particular isolated moments in the cycle. Consequently, there could be large fluctuations in the proportion or amount of the first component and the second components during a single cycle that a conventional system would ignore because the fluctuations could be offset in the single average of the entire cycle, or the measurement at isolated moments may not be taken during a fluctuation in amounts of components. If such fluctuations are present and remain ignored, mixtures having undesirable proportions of the first and second components will be dispensed on portions of articles of manufacture, thereby resulting in a defective or useless adhesive. There is therefore a need for a method and/or system which assures that mixture is dispensed in proper proportion and/or amount on an article of manufacture.

SUMMARY OF THE INVENTION

It is a first object of the present invention to provide a method for monitoring a mixture which overcomes the previously delineated drawbacks of prior methods of monitoring a mixture.

It is a second object of the present invention to provide a method for monitoring a mixture which insures that the components of a mixture are dispensed on an article of manufacture in a proper proportion and/or amount.

According to a first aspect of the present invention a method for monitoring a mixture in a system which includes a first component and a second component flowing toward a mixing location, the first component including a taggant, the monitoring performed for cycles of dispensing the mixture and the method comprising the steps of: acquiring first concentration values of the taggant in the first component of first predetermined intervals of time during one of the cycles; acquiring second concentration values of the taggant in the mixture at the first predetermined intervals of time; determining amounts of the first component in the mixture at the first predetermined intervals of time within the one of the cycles using the second concentration values; determining first average amounts of the first component in the mixture at secondary predetermined intervals of time within the one of the cycles, the secondary predetermined intervals of time being larger than the first predetermined intervals of time; and determining a second average amount of the first component in the mixture for the entirety of one of the cycles.

According to a second aspect of the present invention a method for monitoring a mixture in a system which includes a first component and a second component flowing toward a mixing location, the first component including a taggant, the mixture dispensed in cycles and the method comprising the steps of: determining amounts of the first component in the mixture at first predetermined intervals of time; determining first average amounts of the first component in the mixture at secondary predetermined intervals of time within the one of said cycles, the secondary predetermined intervals of time being larger than the first predetermined intervals of time.

These and other objects, aspects, and advantages of the present invention will become apparent upon reading the following detailed description in combination with the accompanying drawings.

DETAILED DESCRIPTION OF THE PREFERRED EMBODIMENT OF THE INVENTION

Figure 1:
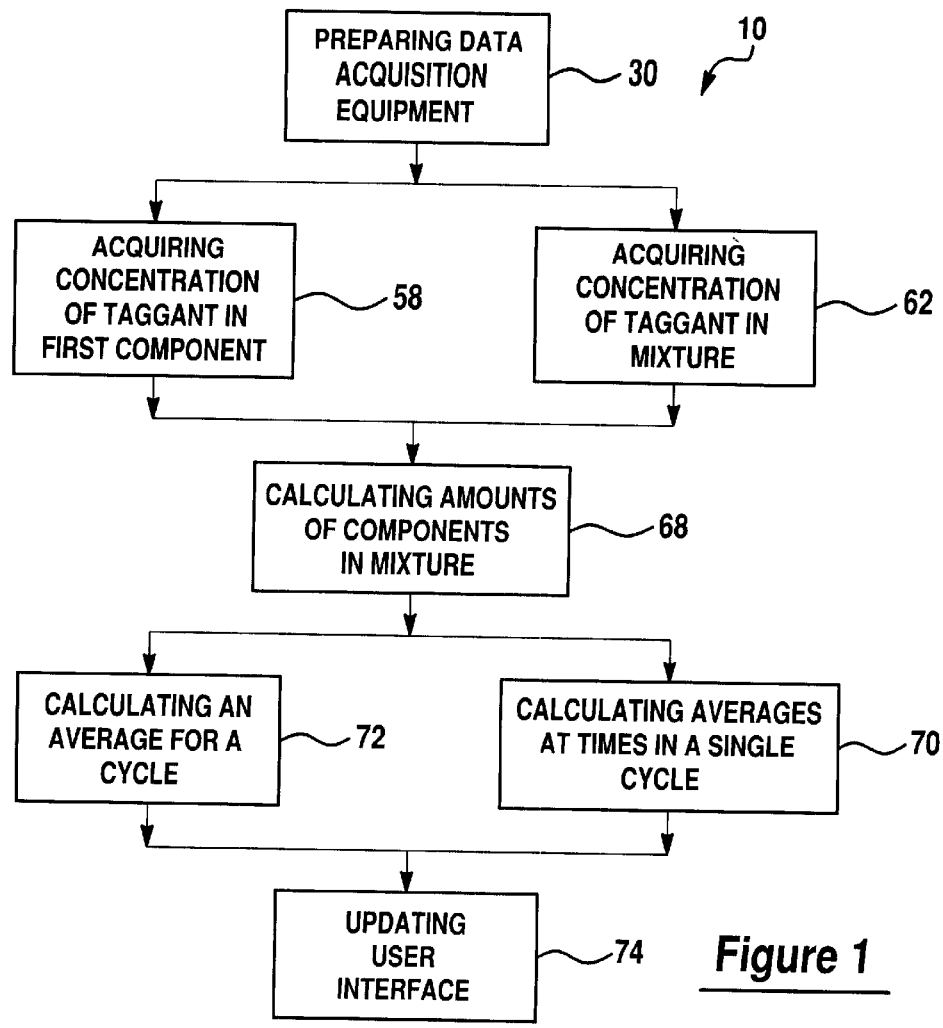
FIG. 1 illustrates a flowchart of a method for monitoring a mixture according to a preferred embodiment of the present invention.
Figure 2:
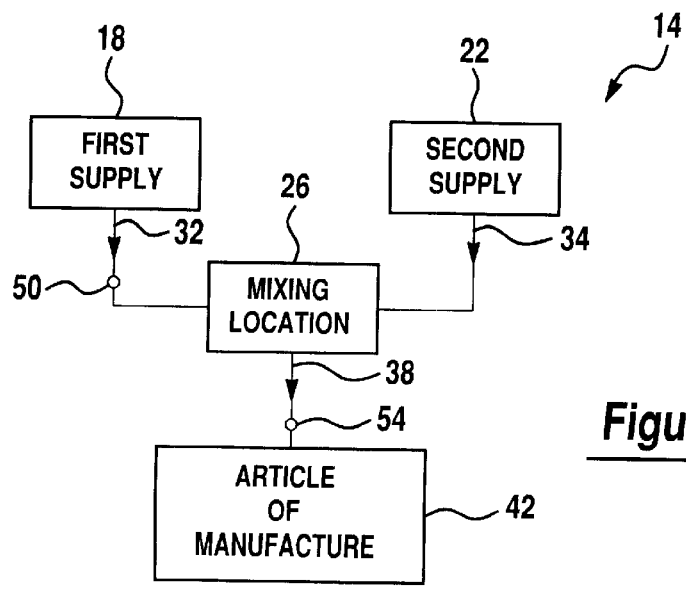
FIG. 2 illustrates a schematic drawing of a system upon which the method of FIG. 1 may be performed.

Referring now to FIG. 1, there is shown a schematic or block diagram of a method 10 for monitoring a mixture according to a preferred embodiment of the present invention. It shall be appreciated that the method 10 of the present invention is illustrated for use in combination with the system 14, illustrated in FIG. 2, however, the concepts and methodologies expressed by method 10 may be used in a variety of systems, schemes, methods, arrangements and/or assemblies.

The system 14, includes a first component which includes a taggant and which is provided by a first supply 18. The system 14 also includes a second component which is provided by a second supply 22. The first and second components of system 14 are selectively directed or channeled toward a mixing point or location 26 of system 14 through tubes or conduits 32, 34 such that a mixture is formed at location 26. Thereafter, the mixture flows through a tube or conduit 38 to a location where the mixture is dispensed upon an article of manufacture 42. In the preferred embodiment of the invention, the first component is a resin type material which includes the taggant, the second component is a "hardener" and the resulting mixture is an adhesive. A particularly appropriate taggant for method 10 is disclosed in the '151 patent.

In one non-limiting embodiment of the present invention, method 10 is utilized to monitor the mixture dispensed by system 14, as system 14 dispenses the mixture upon article 42. In the preferred embodiment, method 10 is performed in cycles and each cycle is a period of time during which a particular amount of a mixture is dispensed on a particular article of manufacture 42. For example, a mixture cycle may be a period of time (e.g., 40 seconds) during which an amount of adhesive (e.g., 40 grams or 10 cubic centimeters) is dispensed upon a hood of an automotive vehicle.

As shown in block 30, method 10 begins by preparing data acquisition equipment of system 14 which is designed to acquire concentrations of the taggant in the first component and/or the mixture for each mixture cycle. In one non-limiting embodiment of the invention, the data acquisition equipment comprises conventional and commercially available equipment which is capable of acquiring and/or determining the amount and/or concentration of a taggant in the first component and/or the mixture which is flowing in and/or through system 14. The equipment is further effective to deliver and/or transmit the measured amount and/or concentration as electric data. In the preferred embodiment of the invention, the data acquisition equipment includes sensors 50, 54 which can determine or "sense" the concentration of taggant in the first component and/or the mixture flowing through tubes or conduits 32, 38, respectively.

Once the data acquisition equipment is prepared for a particular cycle, concentration data is acquired from the system 14 as the system 14 dispenses the mixture for that particular cycle. More specifically, the concentration of taggant in the first component (e.g., the resin) is acquired by sensor 50 of assembly 14, as indicated by block 58 of method 10, and the concentration of the taggant in the mixture is acquired by sensor 54 of assembly 14, as indicated by block 62 of method 10. In the preferred embodiment, the concentrations of the taggant within the first component and the mixture are acquired at predetermined intervals of time (e.g., every second) during each cycle of adhesive which flows through system 14. The concentration of the taggant in the first component is also determined for the entire cycle as an average cycle. This average of the concentration of the taggant within the first component is then saved for use in the next cycle as further explained below.

As the concentrations of the taggant within first component and the mixture are acquired, the amounts of the first and/or second components within the mixture are calculated as indicated by block 68 of method 10. In a non-limiting embodiment, the concentrations of the taggant within the first component and the mixture which are acquired by sensors 50, 54 are transmitted as electronic data by use of conventional busses or wires to a data manipulating device (e.g., a computer) having a software program which is capable of receiving and manipulating the concentrations. In a further non-limiting embodiment, the concentrations are sent to the data manipulating device at the predetermined intervals of time at which the sensors 50, 54 acquire the concentrations and the software program determines and/or calculates the amounts of the first and/or second components in the mixture for each predetermined interval of time using the total amount of mixture which is to be dispensed during the cycle. In the preferred embodiment, the amounts are determined as a ratio or proportion by using the concentration of taggant in the mixture taken at each predetermined interval and dividing it by the average concentration of taggant in the first component from the previous cycle which was saved as previously described. From this ratio or proportion, the amounts of components may be determined by use of conventional mathematical algorithms using the total amount of adhesive which is delivered in one cycle.

Furthermore, in the preferred embodiment, the system 14 is formed such that the portion of the first component which passes by or through mixture sensor 54 in the current cycle is the same or substantially the same as the portion of the first component which passed by or through the sensor 50 in the previous cycle. This is done by having the sensors 50, 54 strategically placed in conduits 32, 38 such that the rate at which the first component and the mixture are flowing is effective to have the first component which flows by the sensor 50 in one cycle also flow by the sensor 54 in the next cycle. Once the ratios or proportions are calculated in the preferred embodiment they are converted to percentages.

After the amounts of each component in the mixture are determined for each predetermined interval of time, averages for the amounts are calculated at secondary predetermined intervals of time, as indicated by block 70. The secondary predetermined intervals of time are intervals of time larger than the predetermined intervals at which the concentrations are acquired, but smaller than the interval of time for a complete cycle for which the mixture is dispensed. For example, a predetermined interval of time for determining the amounts of the first and second components in the mixture could be one second while the secondary predetermined intervals of time for calculating the average of the amounts could be ten seconds for a cycle of forty seconds. In this example, the computer and/or operating software averages the ten "amount values" calculated at the one-second intervals which occur during each ten-second "secondary" interval and averages those ten "amount values". In the preferred embodiment, the software produces a percentage which indicates the average percentage of either the first or the second component in the mixture for each of the secondary predetermined intervals.

In addition to calculating average amounts for secondary predetermined intervals of time, average amounts of the first and second components in the mixture are also calculated for the entire cycle, as illustrated in block or step 72. Returning to the example, the computer and/or operating software computes an average of the forty values measured over the entire forty second cycle.

Both the averages at the secondary predetermined intervals and the average for the entire cycle are stored within the computer's internal memory or are saved on one or more conventional computer disks. In the preferred embodiment, the average amount of the entire cycle are stored as percentages.

These averages are then transmitted or sent to a conventional user interface (e.g., a monitor or display) in order to update the user interface, as indicated by block 74 of method 10. In one non-limiting embodiment, the user interface displays the average amounts which are transmitted to the interface and displays predetermined values which correspond to desirable amounts or concentrations. Particularly, these pre-determined values are the amounts or percentages of which the components of the mixture are designed to be dispensed, and are compared with the actual amounts to evaluate the performance of system 14 and to detect fluctuations in the amounts of components being dispensed. If the amounts or percentages are of a certain degree different than the predetermined values, the interface displays a signal. In the preferred embodiment, the interface sends a signal effective to display or activate a green light if the percentages which indicate amounts of components are within a first degree of difference (i.e., a margin of error) from the predetermined value, the interface sends a signal effective to display or activate a yellow light if the percentages are outside the first degree but are within a second degree of difference from the predetermined value, and the interface sends a signal effective to display or activate a red light if the percentages are outside the second degree of difference from the predetermined values.

It should be understood that the invention is not limited to the exact embodiment or construction which has been illustrated and described but that various changes may be made without departing from the spirit and the scope of the invention.

What is claimed is:

1. A method for monitoring a mixture in a system which includes a first component and a second component flowing toward a mixing location, said first component including a taggant, said monitoring performed for cycles of dispensing said mixture and said method comprising the steps of:

providing a first sensor which is effective to acquire a first concentration value of said taggant in said first component;

acquiring first concentration values of said taggant in said first component at first predetermined intervals of time during one of said cycles;

providing a second sensor which is effective to acquire a second concentration value of said taggant in said mixture, wherein said second sensor is disposed relative to said first sensor whereby a portion of said first component which passes by said first sensor in a particular cycle passes by said second sensor in the next cycle;

acquiring second concentration values of said taggant in said mixture at said first predetermined intervals of time;

determining amounts of said first component in said mixture at said first predetermined intervals of time within said one of said cycles using said second concentration values;

determining first average amounts of said first component in said mixture at secondary predetermined intervals of time within said one of said cycles, said secondary predetermined intervals of time being larger than said first predetermined intervals of time; and determining a second average amount of said first component in said mixture for the entirety of said one of said cycles.

2. A method as in claim 1 further comprising the steps of:

comparing said first average amounts to a first predetermined value; and updating a user interface based upon the difference between said first average amounts and said first predetermined value.

3. A method as in claim 2, wherein said step of updating a user interface includes displaying a signal if one of said first average amounts is of a certain degree different from said first predetermined value.

4. A method as in claim 3 wherein said first average amounts and said first predetermined value are in percentages.

5. A method as in claim 4 further comprising the steps of:

comparing said second average amount to said first predetermined value; and updating a user interface based upon the difference between said second average amount and said first predetermined value.

6. A method as in claim 5, wherein said step of updating a user interface includes producing a signal if said second average amount is of a certain degree different from said first predetermined value.

7. A method as in claim 1, wherein said step of determining amounts of said first component in said mixture at said first predetermined intervals of time includes calculating said amounts using an average concentration of taggant in said first component from a cycle prior to said one of said cycles.

8. A method as in claim 7 wherein said second average amount and said first predetermined value are in percentages.

9. A method for monitoring a mixture in a system which includes a first component and a second component flowing toward a mixing location, said first component including a taggant, said mixture dispensed in cycles and said method comprising the steps of:

providing a first sensor which is effective to detect said taggant;

providing a second sensor which is effective to detect said taggant, wherein said second sensor is disposed relative to said first sensor whereby a portion of said first component which passes by said first sensor in a first cycle passes by said second sensor in a second cycle;

determining amounts of said first component in said mixture at first predetermined intervals of time; and determining first average amounts of said first component in said mixture at secondary predetermined intervals of time within said one of said cycles, said secondary predetermined intervals of time being larger than said first predetermined intervals of time.

10. A method as in claim 9 further comprising:

determining a second average amount of said first component in said mixture for the entirety of said one of said cycles.

11. A method as in claim 9 further comprising:
comparing said first average amounts to a first predetermined value; and
updating a user interface based upon the difference between said first average amounts and said first predetermined value.

12. A method as in claim 11, wherein said step of updating a user interface includes producing a signal if one of said first average amounts is of a certain degree different from said first predetermined value.

13. A method as in claim 12 wherein said first average amounts and said first predetermined value are in percentages.

14. A method as in claim 10 further comprising:
comparing said second average amount to said first predetermined value; and
updating a user interface based upon the difference between said second average amount and said first predetermined value.

15. A method as in claim 14, wherein said step of updating a user interface includes producing a signal if one of said first average amounts is of a certain degree different from said first predetermined value.

16. A method as in claim 9, wherein said step of determining amounts of said first component in said mixture at said first predetermined intervals of time includes calculating said amounts using an average concentration of taggant in said first component from a previous one of said cycles.

17. A method as in claim 16 wherein said second average amount and said first predetermined value are in percentages.

18. A method for monitoring a mixture in a system which includes a first component and a second component flowing toward a mixing location, said first component including a taggant, said monitoring performed for at least two cycles of dispensing said mixture upon articles of manufacture and said method comprising the steps of:

providing a first sensor which is effective to acquire a first concentration value of said taggant in said first component;

acquiring first concentration values of said taggant in said first component as said first component flows toward said mixing location, said values acquired at first predetermined intervals of time during a first one of said cycles;

determining an average concentration value of said taggant in said first component from said first concentration values;.

providing a second sensor which is effective to acquire second concentration values of said taggant in said mixture, wherein said second sensor is disposed relative to said first sensor whereby a portion of said first component which passes by said first sensor during said first cycle passes by said second sensor in a second one of said cycles;

acquiring second concentration values of said taggant in said mixture at second predetermined intervals of time during said second one of said cycles;

determining amounts of said first component in said mixture at said first predetermined intervals of time within said second one of said cycles using said second concentration values and said average concentration value;

determining first average amounts of said first component in said mixture at secondary predetermined intervals of time within said one of said cycles, said secondary predetermined intervals of time being larger than said first predetermined intervals of time; and determining a second average amount of said first component in said mixture for the entirety of said one of said cycles.

19. A method as in claim 18 further comprising:
comparing said first average amounts to a first predetermined value;
updating a user interface based upon the difference between said first average amounts and said first predetermined value.

20. A method as in claim 19, wherein said step of updating a user interface includes producing a signal if one of said first average amounts is of a certain degree different from said first predetermined value.

* * * * *